(12) United States Patent
Shelton

(10) Patent No.: US 7,564,642 B2
(45) Date of Patent: Jul. 21, 2009

(54) APPARATUS, SYSTEM, AND METHOD FOR REPEATABLE RUNOUT CANCELLATION USING RING OF INTEGRATORS

(75) Inventor: Boyd Norvell Shelton, North Ogden, UT (US)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/800,560

(22) Filed: May 7, 2007

(65) Prior Publication Data
US 2008/0278843 A1 Nov. 13, 2008

(51) Int. Cl.
*G11B 5/596* (2006.01)
(52) U.S. Cl. .................................... 360/77.04
(58) Field of Classification Search ............... None
See application file for complete search history.

(56) References Cited

U.S. PATENT DOCUMENTS

| 6,292,324 | B1 * | 9/2001 | Ho et al. ................... 360/77.04 |
| 6,549,362 | B1 * | 4/2003 | Melrose et al. .......... 360/77.04 |
| 7,106,547 | B1 * | 9/2006 | Hargarten et al. ........ 360/77.04 |
| 7,167,336 | B1 * | 1/2007 | Ehrlich et al. ............ 360/77.04 |
| 2003/0133220 | A1 * | 7/2003 | Hsin ....................... 360/77.04 |

* cited by examiner

*Primary Examiner*—K. Wong
(74) *Attorney, Agent, or Firm*—Jordan C. Powell

(57) ABSTRACT

An apparatus, system, and method are disclosed to cancel repeatable runout signals. A linear causal system having an impulse response receives a cancellation signal and outputs a position error signal. An inverse matrix module multiplies the position error signal by an inverse matrix and outputs an intermediate cancellation signal. One or more impulse integration modules each integrate at least one sample of the intermediate cancellation signal in one or more predefined periods and output the cancellation signal.

18 Claims, 3 Drawing Sheets ived with a plurality of modules configured to functionally execute the necessary steps of cancelling repeatable runout signals. These modules in the described embodiments include a linear causal system, an inverse matrix module, one or more integration modules, and a position servo compensator.

APPARATUS, SYSTEM, AND METHOD FOR REPEATABLE RUNOUT CANCELLATION USING RING OF INTEGRATORS

BACKGROUND OF THE INVENTION

1. Field of the Invention

This invention relates to the field of repeatable runout cancellation, and more particularly relates to repeatable runout cancellation systems in disk drives.

2. Description of the Related Art

Many systems have repeatable runout (RRO) signals that need to be cancelled to prevent errors. RRO signals are predictable because of their periodic nature. RRO signals have many origins. In disk drives, imperfections in a disk assembly or the data storage media, misaligned or unbalanced disk platters, a tilt in the spindle motor, or eccentricities introduced into data tracks at servo write time may cause RRO signals. These or other defects may cause synchronized harmonic disturbances when the disk rotates. These defects are not related to track density, and therefore do not scale with the track density. This means that as track densities increase in modem disk drives, the RRO signals have more negative effects on the disk drive's ability to properly read and write data from the disk. Methods that have been used in the past to cancel RRO signals are no longer fast enough or complete enough for modem track densities. These methods cancel only the sinusoidal components of the RRO signals, while leaving the non-sinusoidal RRO signals.

From the foregoing discussion, it should be apparent that a need exists for an apparatus, system, and method to remove both sinusoidal and non-sinusoidal RRO components from an input signal. Beneficially, such an apparatus, system, and method would react quickly to disturbances, without instability from overcorrecting.

SUMMARY OF THE INVENTION

The present invention has been developed in response to the present state of the art, and in particular, in response to the problems and needs in the art that have not yet been fully solved by currently available repeatable runout cancellation methods. Accordingly, the present invention has been developed to provide an apparatus, system, and method for cancelling repeatable runout that overcome many or all of the above-discussed shortcomings in the art.

The apparatus to cancel repeatable runout signals is pro-

The linear causal system, in one embodiment, receives a cancellation signal and outputs a position error signal. The linear causal system also has an impulse response. In another embodiment, the linear causal system has a plant. The plant may have an actuator and an actuator controller. The plant may position the actuator relative to one or more disks in a disk drive based on the cancellation signal.

The inverse matrix module, in a further embodiment, multiplies the position error signal by an inverse matrix and to output an intermediate cancellation signal. The inverse matrix may be the mathematical inverse of an impulse matrix where each column of the impulse matrix has shifted values of the impulse response of the linear causal system. Each of the columns of the inverse matrix may be substantially similar to each other, such that the inverse matrix module only stores one column of the inverse matrix. In another embodiment, each value in the inverse matrix is substantially similar to a single constant value after a number of non-constant rows. An original constant may have been subtracted from each value in the inverse matrix making the single constant value substantially zero. The inverse matrix module may store the non-constant rows and not the constant rows. The inverse matrix module may also wait until one or more previous cancellations have stabilized.

In a further embodiment, the impulse integration modules each integrate at least one sample of the intermediate cancellation signal in one or more predefined periods and output the cancellation signal. There may be one impulse integration module for each sample in the predefined period. Each of the impulse integration modules may store one or more intermediate calculation results.

In one embodiment, the position servo compensator substantially cancels a direct current portion of the position error signal. The output of the position servo compensator may be combined with the cancellation signal to form a position command signal.

A system of the present invention is also presented to cancel repeatable runout signals. The system may substantially be embodied with the modules described above. In particular, the system, in one embodiment, also includes one or more data storage disks with one or more substantially circular data tracks and positioning data, a motor to rotate the data storage disks about an axis, an actuator coupled to a data head, and an actuator controller to receive a position command signal, to position the actuator and the data head relative to the data tracks on the data storage disks based on the position command signal, and to output the position error signal based on the positioning data.

A computer readable medium having computer usable program code programmed for repeatable runout signal cancellation according to the present invention is also presented. The operations in the disclosed embodiments substantially include the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
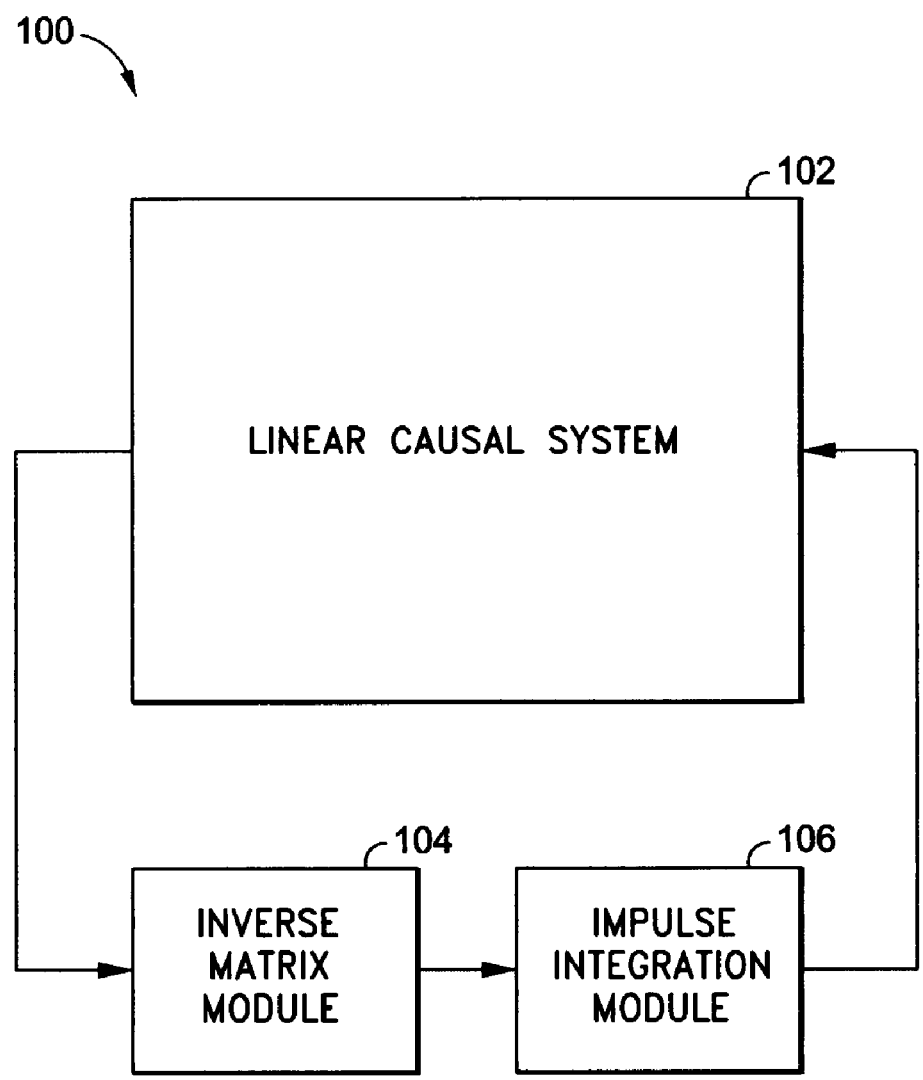
FIG. 1 is a schematic block diagram illustrating one embodiment of a repeatable runout cancellation system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by an optical disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a repeatable runout cancellation system 100. In one embodiment, the system 100 comprises a linear causal system 102, an inverse matrix module 104, and one or more impulse integration modules 106.

In one embodiment, the linear causal system 102 is both linear, causal, and has one or more unwanted RRO signals or harmonic disturbances. In a further embodiment, the linear causal system 102 has an impulse response that can be measured, estimated, or calculated. The linear causal system 102 may be configured to receive a cancellation signal or position command signal, and to output a position error signal (PES). The cancellation signal may be a signal configured to correct one or more error signals or signal components in the linear causal system 102, such as the RRO signals or signal components. In a further embodiment, the cancellation signal is a signal configured to put the linear causal system 102 in a desired system state. The PES may be a signal configured to communicate an error measurement, a difference from a desired signal, a distance from a desired position, or another error signal.

The impulse response of the linear causal system 102 may be measured by inputting a signal that approaches the impulse signal into the linear causal system 102 and measuring the output of the linear causal system 102. The impulse response of the linear causal system 102 may also be estimated based on the impulse response of other similar systems, or based on other factors or characteristics. In a further embodiment, the impulse response of the linear causal system 102 may be calculated mathematically based on system impulse response calculation techniques that are generally known in the art. The impulse response may be measured once before use of the linear causal system 102, or measured and updated periodically based on changes in the linear causal system 102 or conditions. In one embodiment, the impulse response is measured, calculated, or estimated over a predefined period. In one embodiment, the predefined period is based on a physical action or event in the linear causal system 102 such as a periodic rotation or other periodic movement. The predefined period may also be based on a period or sub-period of one or more of the RRO signals, which may-correlate with a physical event as described above.

Because the impulse response of the linear causal system 102 is known, a desired signal can be duplicated on the output of the linear causal system 102 by inputting a precise series of impulses into the input of the linear causal system 102. This is expressed in the matrix formula K*A=PES. K is a series of constants, and A is a matrix where each matrix column comprises the impulse response of the linear causal system 102 shifted down by one sample from the previous column. In one embodiment, the length of vector K, the number of rows in matrix A, and the number of columns in matrix A are each equal to the number of samples in the predefined period described above. K*A is a summation of the impulse responses scaled by the vector K, and has the same length as the vector K. The matrix A is invertible because the rows and columns of the matrix A are independent, meaning that the matrix A is non-singular. This rows and the columns of the matrix A are independent because each column of the matrix A is the impulse response of the linear causal system 102 shifted by one sample from the previous column. Because the matrix A is invertible, $A^{-1}$ can be calculated. Therefore, $K*A*A^{-1}=PES*A^{-1}$, and $K=PES*A^{-1}$. This means that K can be calculated if PES is known. Once K is calculated, the PES signal can be recreated by inputting the series of impulses K into the linear causal system 102. Inversely, by inputting the negative of K, −K, into the linear causal system 102, the PES can be cancelled from the linear causal system 102.

In one embodiment, the inverse matrix module 104 is configured to multiply the PES by an inverse matrix. The inverse matrix may be substantially similar to $A^{-1}$ as described above. The inverse matrix module 104 may be further configured to output an intermediate cancellation signal. The intermediate cancellation signal may be substantially similar to either K or −K described above. If the intermediate signal is substantially similar to K, either the impulse integration modules 106 or the input of the linear causal system 102 may invert the intermediate cancellation signal.

The inverse matrix may have one or more specific properties because the columns of the original matrix, or the A matrix, are shifted values of the same impulse response signal. In one embodiment, the columns of the inverse matrix are each identical, or substantially similar. In another embodiment, the values in each column converge to a single substantially constant value after a number of initial non-constant values. To minimize the memory and processing overhead necessary for matrix multiplication and storage, the inverse matrix may be altered in one or more ways. In one embodiment that is discussed in greater detail with regard to FIG. 2, the system 100 further comprises a position servo compensator configured to remove a direct current portion of the PES. This allows a constant number similar to the single substantially constant value to be subtracted from each value in the inverse matrix. The constant number represents the direct current portion of the PES. After the subtraction, the values after the initial non-constant values will be substantially zero, and the inverse matrix module 104 does not need to store them. This will also decrease the amount of processing power necessary to perform the multiplication, because of the multiplications by zero. In another embodiment, because each of the rows of the inverse matrix are substantially similar, the inverse matrix module 104 is configured to store only one column.

In one embodiment, the impulse integration modules 106 are configured to integrate the intermediate cancellation signal and to output a cancellation signal or a cancellation signal. Each of the impulse integration modules 106 may be an integrator, as is well known in the art or another module configured to integrate the intermediate cancellation signal. In a further embodiment, the system 100 comprises one impulse integration module 106 for each sample in the predefined period. By integrating the cumulative intermediate cancellation signals for each sample, the impulse integration modules 106 each output a cumulative cancellation signal to cancel each previously learned error from each individual sample in each predefined period. The impulse integration modules 106 may be in a series configuration, the impulse integration modules 106 spaced equally in time according to the PES sampling frequency. This configuration may be substantially similar to what is known in the art as a ring of integrators.

In a further embodiment, each of the impulse integration modules 106 are configured to store one or more intermediate calculation results. The intermediate calculation results may be the integration results, the intermediate cancellation signal, or other calculation results. Because each sample is only present once in each of the predefined periods, the impulse integration modules 106 may store the intermediate calculation results until the sample is present again in the next predefined period. In a further embodiment, the impulse integration modules 106 may store samples from the intermediate cancellation signal until the impulse integration modules 106 have output the cancellation signals from a previous predefined period.

In one embodiment, the inverse matrix module 104 uses one or more PES samples before a PES sample and one or more PES samples after the PES sample to generate the intermediate cancellation signal for the PES sample, as described above. This means that the inverse matrix module 104 cannot calculate the intermediate correction signal immediately. Because of the repeatable nature of the RRO signals, and because the impulse integration modules 106 do not apply the cancellation signals to the linear causal system 102 until at least a portion of a predefined period has passed, the inverse matrix module 104 may delay the calculation of the intermediate cancellation signal for a number of samples. This means that in one embodiment, the inverse matrix module 104 may remember only the number of samples involved in the intermediate correction signal calculation, instead of remembering the PES samples for an entire predefined period, as would be required for an immediate calculation.

Figure 2:
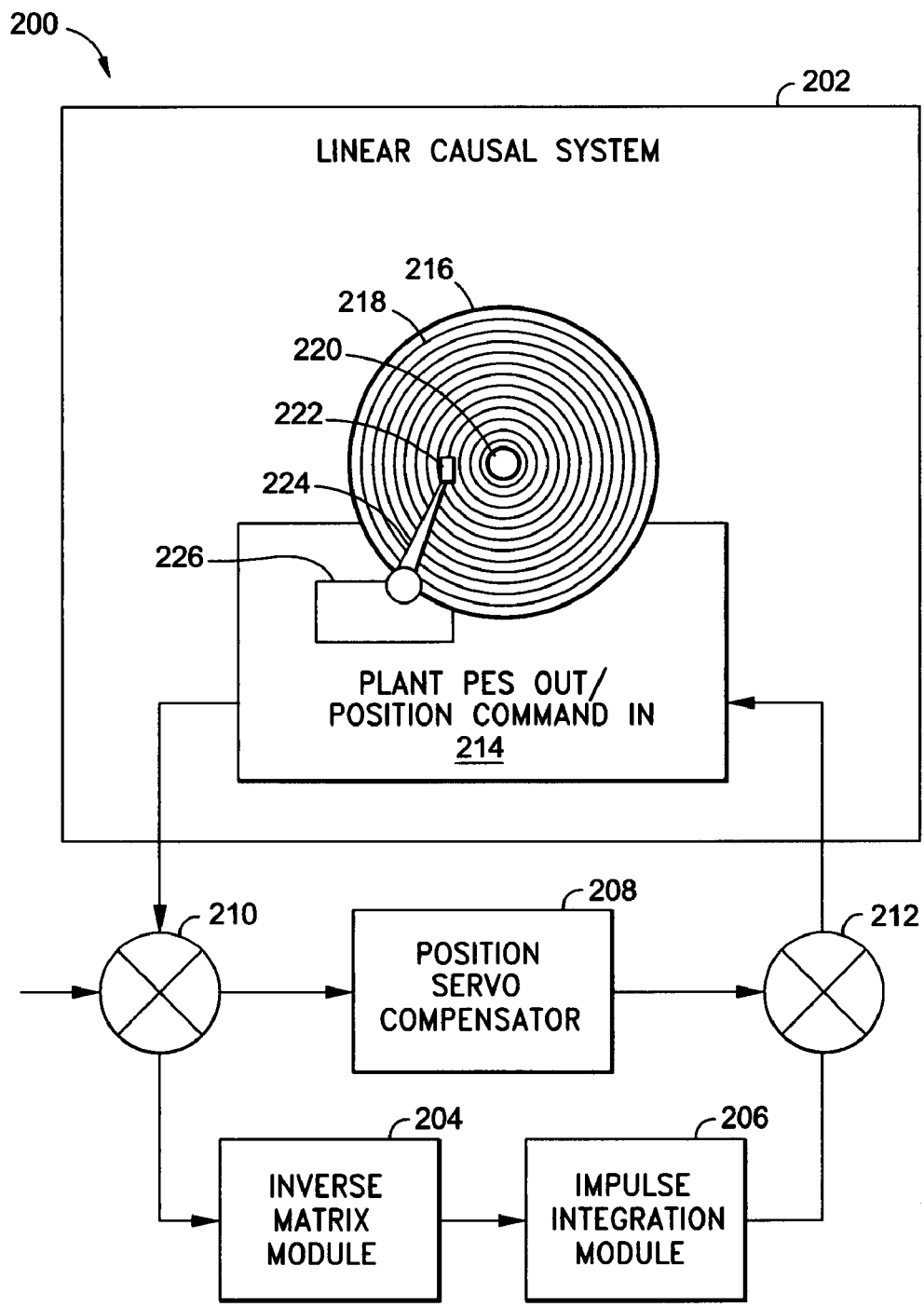
FIG. 2 is a schematic block diagram illustrating another embodiment of a repeatable runout cancellation system in accordance with the present invention.

FIG. 2 depicts a further embodiment of a repeatable runout cancellation system 200 for illustration purposes. In one embodiment, the RRO cancellation system 200 comprises a linear causal system 202, an inverse matrix module 204, one or more impulse integration modules 206, a position servo compensator 208, and one or more combining modules 210, 212.

In one embodiment, the linear causal system 202, the inverse matrix module 204, and the impulse integration modules 206 are substantially similar to the linear causal system 102, the inverse matrix module 104, and the impulse integration modules 106 of FIG. 1. In one embodiment, the inverse matrix module 204 and the impulse integration module 206 may be part of a cancellation module or RRO module.

In a further embodiment, the linear causal system 202 comprises a plant 214. In one embodiment, the plant 214 is oriented in a feedback loop configuration with the other modules in the system 200. The plant 214 may be configured to receive a position command signal or cancellation signal from the combining module 212 as an input, and to output a PES that is returned as a feedback signal to the combining module 210. The plant may output the PES as an input to the position servo compensator 208 and to the inverse matrix module 204.

In one embodiment, the plant 214 is a plant, as is generally known in the art, with an actuator controller 226 and an actuator 224. In control theory, a plant is a device that is controlled by a feedback loop. The plant 214 may be part of an optical, floppy, or hard disk drive, or the plant may be part of another system involving RRO signals. In a further embodiment, the actuator 224 may be coupled to a data head 222. The data head 222 may be a read head, a write head, or a read/write head. The data head 222 may be a magneto-resistive head, an optical head, a transducer head, or another type of head. In one embodiment, the linear causal system 202 also comprises one or more data storage disks 216. The data storage disks 216 may have one or more substantially circular data tracks and positioning data 218. A motor 220, which may be a spindle motor or another motor type, may be configured to rotate the data storage disks 216 about an axis.

In one embodiment, the plant 214 uses the position command signal to determine a position for the actuator 224 and the data head 222, and positions the actuator 224 and the data head 222 relative to the data tracks 218. The plant 214 may use a rotary voice coil motor or other means to position the actuator 224 and the data head 222. In one embodiment, a digital to analog converter (DAC) (not shown) converts the position command signal from a digital signal to an analog signal before the plant 214 uses the position command signal. In a further embodiment, an amplifier (not shown) amplifies the position command signal before the plant 214 uses the position command signal. The amplifier may be a transconductance amplifier, or another amplifier type. The plant 214 may send the position command signal directly to the actuator controller 226.

In one embodiment, the plant 214 uses the position data 218 from the data storage disks 216 to generate the PES. The position data 218 may be a dedicated servo, an embedded servo, a buried servo, another servo type, or another position indicator type. In a further embodiment, the plant 214 uses the position data 218 to calculate and to output a head position signal to the combining module 210, and the combining module 210 subtracts the head position signal from a target position signal and outputs the result as the PES. In one embodiment, the plant 214, the combining module 210, or another module may further demodulate, convert, or adjust the PES before the position servo compensator 208 and the inverse matrix module 204 receive the PES.

In one embodiment, the system 200 also comprises a position servo compensator 208. The position servo compensator 208 may be a position servo compensator as is generally known in the art. The position servo compensator 208 may further be a Proportional-Integral-Derivative (PID) compensator, as is known in the art. The position servo compensator 208 may receive an input signal from the combining module 210, or directly from the linear causal system 202. The position servo compensator 208 may output a position compensated signal. The position servo compensator may receive the same signal as the inverse matrix module, or an equivalent signal. The received input signal may be the PES, as described above, or the PES combined with one or more system inputs. In one embodiment, the position compensated signal may be configured to cancel a direct current portion of the PES. In a further embodiment, the position servo compensator 208 uses either proportional, proportional-integral, or proportional-integral-derivative techniques to produce a position compensated signal from the PES.

In one embodiment, the system 200 further comprises one or more combining modules 210, 212. The combining modules 210, 212 may be summers, multipliers, or other signal combiners. One or more inputs to the combining modules 210, 212, may also have inverters configured to invert or negate one or more input signals. The first combining module 210 may be configured to combine the output signal of the linear causal system 202 with one or more system inputs. Alternatively, the combining module 210 may split the output signal from the linear causal system 202 and send it to the position servo compensator 208 and the inverse matrix module 204 without combining the signal with another input signal. The first combining module 210 may output a first combined signal to the inputs of the position servo compensator 208 and the inverse matrix module 204, or may output the combined signal to another module for further processing. As described above, the first combining module 210 may be configured to subtract the output of the plant 214 from a second input, such as a target position signal or the like.

In one embodiment, the second combining module 212 is configured to combine the output of the position servo compensator 208 with the output of the impulse integration modules 206, and to output a second combined signal to the linear causal system 202. In one embodiment, the second combined signal is a position command signal. In a further embodiment, the second combining module 212 may also have multiple outputs, which may be sent to other systems or other modules in the system 200.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
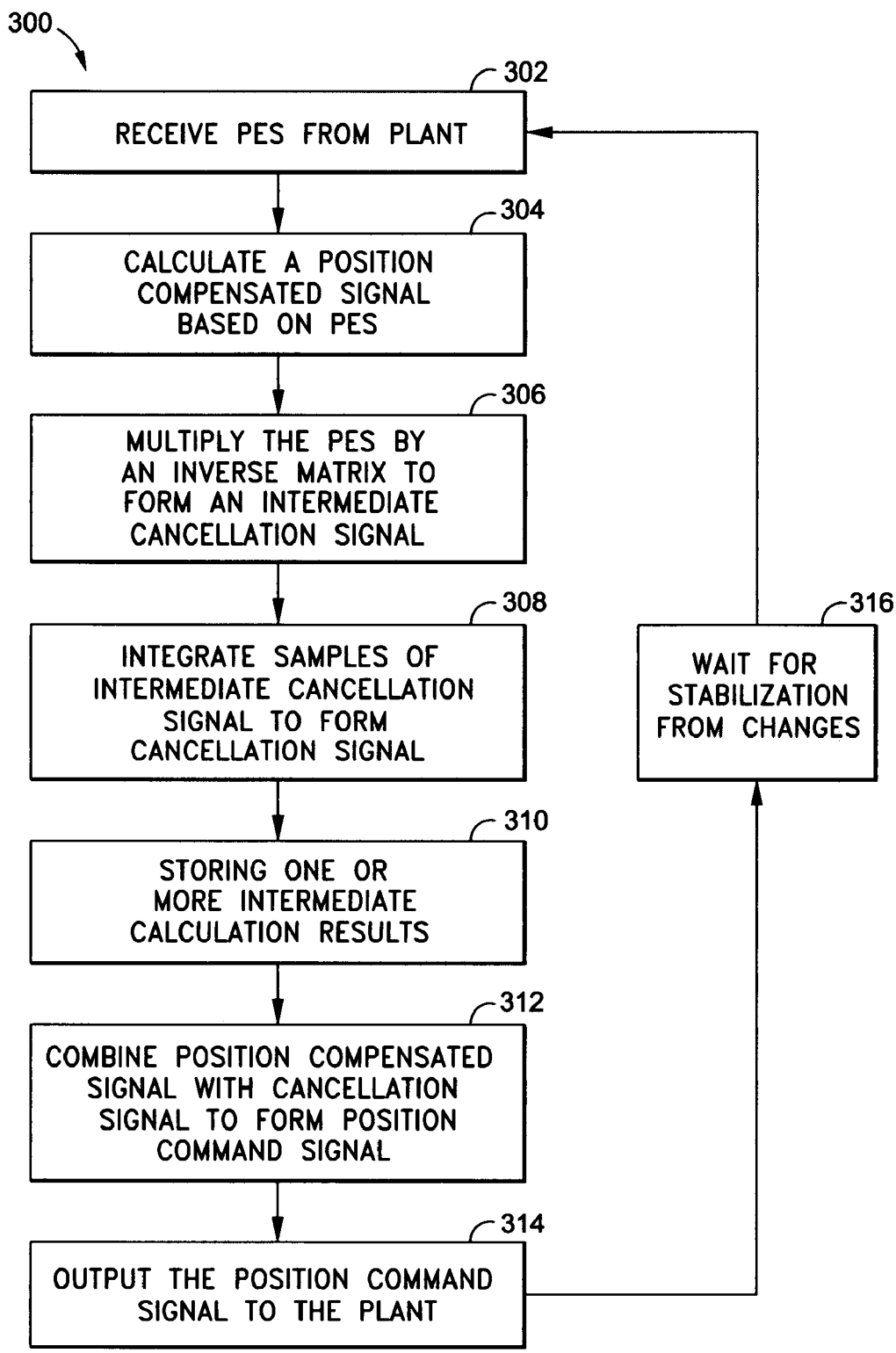
FIG. 3 is a schematic flow chart diagram illustrating one embodiment of a repeatable runout cancellation method in accordance with the present invention.

FIG. 3 illustrates one embodiment of a repeatable runout cancellation method. The position servo compensator 208 and the inverse matrix module 204 receive 302 the PES from the linear causal system 202, from the first combining module 210, or from another module which has further processed the PES. To prevent the system 200 from overcorrecting, the PES should have already stabilized from previous corrections.

The position servo compensator 208 calculates 304 a position compensated signal based on the PES. The position compensated signal may substantially correct a direct current portion of the PES, allowing the inverse matrix module 204 to use a simplified inverse matrix, as described above.

The inverse matrix module 204 multiplies 306 the PES by an inverse matrix to form an intermediate cancellation signal. The inverse matrix may be simplified or condensed to decrease the memory and processing power that the matrix multiplication requires, as described above. The inverse matrix module 204 may also delay calculating the intermediate cancellation signal for one or more samples, as described above.

The impulse integration modules 206 integrate 308 samples of the intermediate cancellation signal to form a cancellation signal. The cancellation signal represents a cumulative cancellation or correction signal comprising a sum of previous corrections for each sample of the predefined period.

The impulse integration modules 206 may store 310 one or more intermediate calculation results until the proper samples are present. The impulse integration modules 206 may store 310 the intermediate calculation results for one or more of the predefined periods or cycles, or for only a portion of a predefined period.

The combining module 212 combines 312 the position compensated signal with the cancellation signal to form the position command signal. The combining module 212 outputs 314 the position command signal to the linear causal system 202. The inverse matrix module 204 waits 316 one or more predefined periods or cycles for the PES to stabilize from the changes.

Although the description of the present invention has utilized various embodiments, it will be recognized that the present invention is not limited to the specific embodiments described. Rather, the present invention encompasses all variants incorporating the essence of the ideas presented in the above description.

What is claimed is:

1. An apparatus to cancel repeatable runout signals, the apparatus comprising:
   a linear causal system having an impulse response, the linear causal system configured to receive a cancellation signal and to output a position error signal;
   an inverse matrix module configured to multiply the position error signal by an inverse matrix and to output an intermediate cancellation signal, wherein the inverse matrix is the mathematical inverse of an impulse matrix wherein each column of the impulse matrix comprises shifted values of the impulse response of the linear causal system; and one or more impulse integration modules each configured to integrate at least one sample of the intermediate cancellation signal in one or more predefined periods and to output the cancellation signal;

wherein at least a portion of the inverse matrix module and the one or more impulse integration modules comprise at least one of logic hardware elements and executable code, the executable code stored on one or more computer readable media.

2. The apparatus of claim 1, wherein each of the columns of the inverse matrix are substantially similar to each other and the inverse matrix module is further configured to store only one column of the inverse matrix.

3. The apparatus of claim 1, wherein each value in the inverse matrix is substantially similar to a single constant value after a number of non-constant rows.

4. The apparatus of claim 3, wherein further comprising a position servo compensator configured to substantially cancel a direct current portion of the position error signal.

5. The apparatus of claim 3, wherein the single constant value is substantially zero after an original constant value has been subtracted from each value in the inverse matrix.

6. The apparatus of claim 3, wherein the inverse matrix module is further configured to store the non-constant rows and not to store the one or more rows that are substantially equal to the single constant value.

7. The apparatus of claim 1, wherein the inverse matrix module is further configured to wait until one or more previous cancellations have stabilized.

8. The apparatus of claim 1, wherein the linear causal system further comprises a plant.

9. The apparatus of claim 8, wherein the plant comprises an actuator and an actuator controller.

10. The apparatus of claim 9, wherein the plant is configured to position the actuator relative to one or more disks in a disk drive based on the cancellation signal.

11. The apparatus of claim 1, wherein there is one impulse integration module for each sample in the predefined period, and further wherein the impulse integration modules are spaced in time according to a sampling frequency of the position error signal.

12. The apparatus of claim 11, wherein each of the impulse integration modules are further configured to store one or more intermediate calculation results.

13. A system to cancel repeatable runout signals, the system comprising:

one or more data storage disks comprising one or more substantially circular data tracks and positioning data;

a motor configured to rotate the data storage disks about an axis;

an actuator coupled to a data head;

an actuator controller configured to receive a position command signal, to position the actuator and the data head relative to the data tracks on the data storage disks based on the position command signal, and to output a position error signal based on the positioning data;

a position servo compensator configured to receive the position error signal and to output a position compensated signal;

an inverse matrix module configured to multiply the position error signal by an inverse matrix and to output an intermediate cancellation signal, wherein the inverse matrix is a mathematical inverse of an impulse matrix wherein each column of the impulse matrix comprises shifted values of an impulse response of the system;

one or more impulse integration modules each configured to integrate at least one sample of the intermediate cancellation signal in one or more predefined periods and to output one or more cancellation signals configured to cancel one or more repeatable runout components from the position error signal when combined with the position compensated signal; and a combining module configured to combine the position compensated signal and the cancellation signals into the position command signal;

wherein at least a portion of the inverse matrix module, the one or more impulse integration modules, and the combining module comprise at least one of logic hardware elements and executable code, the executable code stored on one or more computer readable media.

14. The system of claim 13, wherein one or more rows comprising substantially similar constant values are removed from the inverse matrix.

15. The system of claim 13, wherein there is one impulse integration module for each sample in the predefined period, and further wherein the impulse integration modules are spaced in time according to a sampling frequency of the position error signal.

16. A computer readable medium having computer usable program code programmed for repeatable runout signal cancellation, the operations of the program code comprising:

receiving a position error signal from a linear causal system having an impulse response;

calculating a position compensated signal based on the position error signal;

multiplying the position error signal by an inverse matrix to form an intermediate cancellation signal, wherein the inverse matrix is a mathematical inverse of an impulse matrix wherein each column of the impulse matrix comprises shifted values of the impulse response of the linear causal system;

integrating samples of the intermediate cancellation signal based on one or more predefined periods to form one or more cancellation signals;

combining the position compensated signal and the cancellation signals into a position command signal; and sending the position command signal to the linear causal system.

17. The computer readable medium of claim 16, wherein further comprising:

storing one or more intermediate calculation results.

18. The computer readable medium of claim 16, wherein further comprising:

waiting for the position error signal to stabilize from previous changes.

* * * * *